United States Patent
Burkitt, III et al.

[11] Patent Number: 5,680,496
[45] Date of Patent: Oct. 21, 1997

[54] FIBER OPTIC CABLE ASSEMBLY FOR PERIMETER LIGHTING

[75] Inventors: Garrett J. Burkitt, III, Simi Valley; Dennis C. Dunn, Thousand Oaks; Kevin L. Potucek, Simi Valley, all of Calif.

[73] Assignee: American Products, Inc., Moorpark, Calif.

[21] Appl. No.: 731,408

[22] Filed: Oct. 18, 1996

[51] Int. Cl.$^6$ .................................................. G02B 6/44
[52] U.S. Cl. ................... 385/100; 362/36; 385/115; 385/901
[58] Field of Search ............................ 385/115, 116, 385/100, 102, 901; 362/32

[56] References Cited

U.S. PATENT DOCUMENTS

| | | | |
|---|---|---|---|
| 3,614,414 | 10/1971 | Gores | 362/32 |
| 5,153,932 | 10/1992 | Blyler et al. | 385/115 |
| 5,231,689 | 7/1993 | Reidinger | 385/115 |
| 5,461,548 | 10/1995 | Esslinger et al. | 362/32 |

*Primary Examiner*—John Ngo
*Attorney, Agent, or Firm*—Pretty, Schroeder & Poplawski

[57] ABSTRACT

The fiber optic cable assembly mounts to a perimeter surface of a swimming pool or a spa to provide lighting around the perimeter of the swimming pool or spa. The fiber optic cable assembly includes a bundle of fiber optic fibers, a tube, a track, and a plurality of fasteners. The front surface of the track and the rear surface of the tube cooperatively define a chamber between the track and the tube to eliminate interference between the fasteners and the tube such that the tube is uniformly received in the track. Another embodiment of the invention provides a track with a rear surface that defines a reservoir. The reservoir advantageously collects excess adhesive used in the mounting process of the track to prevent unsightly and difficult to remove excess adhesive from building up around the track.

11 Claims, 1 Drawing Sheet

FIBER OPTIC CABLE ASSEMBLY FOR PERIMETER LIGHTING

BACKGROUND OF THE INVENTION

The invention relates generally to lighting for swimming pools and spas, and, more particularly, to fiber optic cable assemblies that are mounted along the perimeter of swimming pools or spas.

Submersible electric lights for the illumination of swimming pools and spas have become well known over the years. More recently, it has become popular to use fiber optic cables in swimming pool lighting systems. In one particular application, a bundle of fiber optic fibers is placed inside of a transparent flexible plastic tube mounted on a track located above the waterline around the edge of a swimming pool. When one or both ends of the fiber optic bundle is exposed to a light source, the entire length of the bundle glows, thereby creating an attractive low-level neon-type lighting effect around the perimeter of the swimming pool. This effect is known as "side out" lighting or "side out" illumination and is caused by the imperfections inherent in each fiber. In particular, these imperfections cause some light to escape from the cylindrical side surface of each fiber as light travels from one end of the fiber to the other.

One particular problem associated with some conventional tube and track assemblies used for side out fiber optic illumination is that they are labor intensive, are difficult to install, have limited durability and can have a poor quality appearance. In particular, one such assembly includes a track that is mounted to a swimming pool perimeter surface by mounting screws and silicone adhesive. The mounting screws are driven through the track at longitudinally spaced locations to attach the track to the perimeter surface of the swimming pool. Because the plastic tube mates with the track, the tube has a flat rear surface with opposing edges that snap into the track. The tube is sized to accept a bundle of fiber optic fibers therein. The track has a U-shaped cross section and includes retaining flanges on the top and bottom of the opposing walls of the "U" so that the edges of the flat rear surface of the plastic tube can snap into and be held within the track.

One drawback associated with this fiber optic perimeter lighting assembly is that the longitudinally-spaced screws must be manually countersunk into the track so that the screw heads do not project into the space inside the U-shaped track that normally is occupied by the flat back of the plastic tube. In this regard, the perfect installation of all of the countersunk screws holding the track around the perimeter of the pool is difficult. The heads of a few improperly countersunk screws can interfere with the rear surface of the plastic tube, thereby causing the plastic tube not to fit within the track at that location. In time, this failure to completely mount the tube within the track can cause the tube to become further dislodged from the track or become vulnerable to further removal by children who use the pool. In addition such interference can cause bright spots in the cable assembly that detract from the overall uniform appearance of the lighting effect.

Another drawback is associated with unattractive excess adhesive residue that can be visible after the track has been installed. When the track is pressed up against the wall around the perimeter of a pool, excess silicone adhesive applied to the back of the track can be squeezed out from behind the track. This silicon adhesive residue is undesirable because it is rough, unsightly and difficult to remove.

It should therefore be appreciated that there is a need for a side out fiber optic perimeter lighting assembly that is easy to install yet results in a quality installation where the tube fits uniformly in the track and no unsightly excess adhesive is visible along the track. The present invention fulfills this need.

SUMMARY OF THE INVENTION

The present invention provides a side out fiber optic perimeter lighting assembly that is easy to install yet results in a quality installation where the tube fits uniformly in the track and no unsightly excess adhesive is visible along the track. The fiber optic cable assembly can be mounted to a perimeter surface of a swimming pool or a spa to provide lighting around the perimeter of the swimming pool or spa.

The fiber optic cable assembly includes a bundle of fiber optic fibers, a tube, a track, a plurality of fasteners and securing means. The tube has a front surface and a rear surface. The bundle of fiber optic fibers is contained within the tube. The track is longitudinal in shape and has a front surface. The plurality of fasteners engage the front surface of the track to fasten the track to the perimeter surface. The invention also includes the means for securing the tube to the track such that the rear surface of the tube faces the front surface of the track and wherein the front surface of the track surface of the tube cooperatively define a chamber between the track and the tube when secured together to receive the fasteners and eliminate interference between the fasteners and the tube when the assembly is mounted to the perimeter surface.

In a more detailed feature of the invention, the rear surface of the tube has first and second longitudinally extending edges and the front surface of the track defines two longitudinally extending edge flanges. The edge flanges of the track are sized to accept the edges of the rear surface of the tube therein to hold the tube within the track. In yet another more detailed aspect of the invention, the rear surface of the tube defines a longitudinally extending depression and the front surface of the track defines a longitudinally extending recess within the track.

The primary advantage associated with the invention is that an internal space, or chamber is provided to eliminate interference between the heads of the installation screws and the tube so that the tube is uniformly received in the track, resulting in increased ease of installation. This arrangement also provides for increased durability and less of a likelihood that children will remove the tube from the track and damage the lighting system. In addition, because the tube is uniformly installed within the track, the entire perimeter lighting system provides uniform light and has an enhanced, high quality appearance.

In another feature of the invention, the rear surface of the track defines at least one longitudinally extending reservoir sized to retain excess adhesive therein such that the adhesive does not squeeze out from behind the track when the track is mounted on the perimeter surface of the pool. In a more detailed aspect of this invention, the rear surface of the track defines two longitudinally extending reservoirs. When the track is placed up against the perimeter surface and the screws are tightened, any excess adhesive is squeezed toward the reservoir. Thus, the reservoir advantageously prevent the excess adhesive from escaping from under the track to form rough, unsightly and difficult to remove residue visible along the edges of the track.

Other features and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

The following drawings illustrate the preferred embodiment of the invention. In such drawings.

DESCRIPTION OF THE PREFERRED EMBODIMENT

Figure 1:
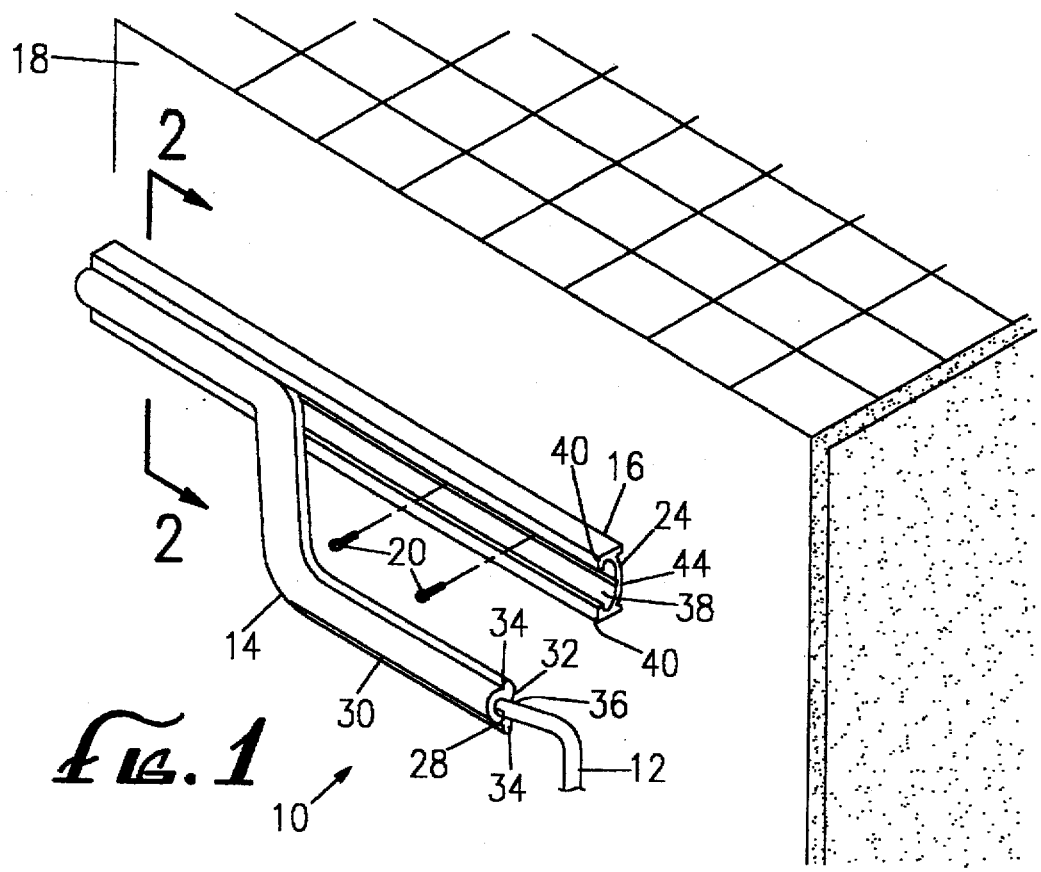
FIG. 1 is perspective view of a partially-installed preferred fiber optic cable assembly according to the invention.

With reference to the drawings, the present invention is preferably embodied in a fiber optic cable assembly for lighting the perimeter of a swimming pool, a spa or the like. The fiber optic cable assembly is generally referred to by the reference numeral 10 and includes a bundle of fiber optic fibers 12 held within a transparent or translucent tube 14 configured to mount to a special track 16 secured to the perimeter surface 18 of a pool, or other surfaces desired to be illuminated, by screws 20 or other suitable fasteners or adhesive. The preferred fiber optic cable assembly advantageously provides an internal space, or chamber 22, to eliminate interference between the heads of the installation screws and the tube so that the tube is uniformly received in the track without bulges or other deformaties at the locations of the screws. In addition, the track has a rear surface 24 configured to retain excess adhesive 26 behind the track to prevent the adhesive from squeezing out from behind the track. Once it emerges from behind the track, such excess adhesive is time consuming and difficult to clean up. The aforementioned arrangement results in a perimeter lighting system with increased durability, easier installation and a quality appearance.

The bundle of fiber optic 12 is made up of individual fiber optic fibers that provide for side out lighting, i.e., the fibers emit some light along their length when a light source is exposed to one or both of their ends. Large core polymer optic fiber ("Lcpof") or polymethyl methacrylate ("pmma") fiber optic fibers can be used to make up the bundle. As is well known in the art, one or both ends of the bundle can be connected to a light source (not shown).

Figure 2:
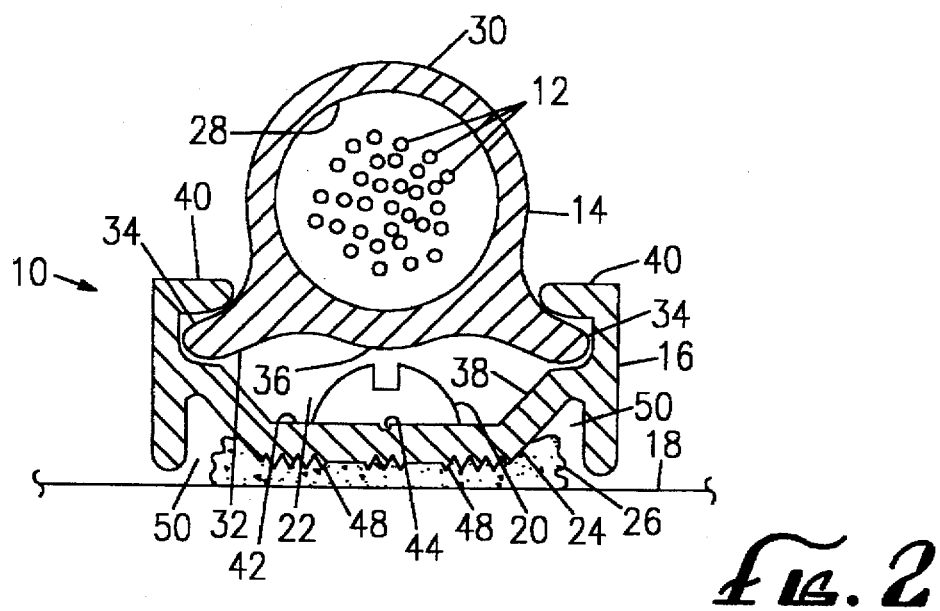
FIG. 2 is a cross sectional view of the preferred fiber optic cable assembly taken about line 2—2 of FIG. 1.

As shown in FIGS. 1 and 2, the tube 14 has an internal longitudinal passage 28 sized to accept the bundle of fiber optic fibers 12 therein. The tube has a curved or partially cylindrical front surface 30 and a specially configured rear surface 32 that includes two longitudinally extending edges 34. A rear surface of the tube preferably defines a longitudinally-extending depression 36 located between the longitudinally extending edge to form one of the walls of the screw head receiving chamber. The tube can be made of transparent or translucent flexible PVC plastic or other suitable material. The tube holding the fiber optic bundle mounts within the special track 16, which is described below.

The track 16 has an elongated longitudinal shape defined by a front surface 38 and two longitudinally extending "L"-shaped flanges 40 extending outwardly from the front surface of the track. The flanges are spaced apart a distance sufficient to allow the opposed edges 34 of the tube 14 to fit therebetween. In particular, during installation, the edges of the tube are flexed toward each other and inserted between the flanges of the track. When the edges of the tube are released, they assume their original shape and occupy the space between the flanges on the track. This advantageously results in the tube being secured to the track.

The front surface of the track is shaped to define a longitudinally-extending central recess 42 with a small notch 44 running along the longitudinal centerline of the track. The recess forms another wall of the screw head receiving chamber 22 such that when the tube is inserted into the track (see FIG. 2), the recess on the front surface of the track and the depression 36 on the rear surface of the tube cooperate to accept the heads of screws 20 therein. The small notch advantageously allows the screws or a drilling to easily be located and driven through the center of the track during the installation process. The track can be made of rigid PVC plastic or other material suitable for a particular application.

Because the heads of the screws 20 fit within the aforementioned chamber 22 between the tube 14 and the track 16, the preferred fiber optic cable assembly 10 advantageously provides for easy attachment of the track to the perimeter surface 18 of the pool without the need to countersink the screws. Another related advantage is that minor variations in the height of installed screws have no effect upon the installation of the tube in the track. Accordingly, the tube of the preferred assembly is easier to install and the resulting installation is of high quality and durability because the tube fits securely and uniformly within the track along the entire perimeter of the pool.

As shown in FIG. 2, the specially configured rear surface 24 of the track 16 prevents unsightly adhesive residue 26 from squeezing out from behind the track during the installation process. In particular, the rear surface of the track has a number of longitudinal ridges 48 sandwiched between two longitudinal recesses 50 that act as reservoirs located above and below the ridges. The ridges provide increased surface area for the track to bond with the adhesive 26, which can be of the silicon based type or any other suitable adhesive.

During the installation process, a bead of adhesive 26 is applied to the ridges 48 on the rear surface 46 of the track 16. When the track is placed up against the perimeter surface 18 and the screws 20 are tightened, any excess adhesive is squeezed downwardly and upwardly away from the ridges and into the reservoirs 50. Thus, the reservoirs advantageously prevent the excess adhesive from escaping from under the track to form rough, unsightly and difficult to remove residue visible along the edges of the track.

While a particular form of the invention has been illustrated and described, it will be apparent that various modifications can be made without departing from the spirit and scope of the invention. Accordingly, it is not intended that the invention be limited, except as by the appended claims.

We claim:

1. A fiber optic cable assembly for mounting to a perimeter surface of a swimming pool or a spa to provide lighting around the perimeter of the swimming pool or spa, comprising:

a tube having a front surface and a rear surface;

a bundle of fiber optic fibers contained within the tube;

a longitudinal track having a front surface;

a plurality of fasteners engaging the front surface of the track to fasten the track to the perimeter surface;

means for securing the tube to the track such that the rear surface of the tube faces the front surface of the track; and wherein the front surface of the track and the rear surface of the tube cooperatively define a chamber between the track and the tube when secured together to receive the fasteners and eliminate interference between the fasteners and the tube when the assembly is mounted to the perimeter surface.

2. The fiber optic cable assembly of claim 1, wherein the rear surface of the tube has first and second longitudinally extending edges and the front surface of the track defines two longitudinally extending edge flanges sized to accept the edges of the rear surface therein to secure the tube to the track.

3. The fiber optic cable assembly of claim 1, wherein the front surface of the tube is curved.

4. The fiber optic cable assembly of claim 1, wherein the rear surface of the tube defines a longitudinally extending depression to cooperate with the front surface of the track to define the chamber.

5. The fiber optic cable assembly of claim 4, wherein the front surface of the track also defines a longitudinally extending recess for cooperation with the rear surface of the tube to define the chamber.

6. The fiber optic cable assembly of claim 1, wherein the front surface of the track defines a longitudinally extending recess for cooperation with the rear surface of the tube to define the chamber.

7. The fiber optic cable assembly of claim 1, wherein the fasteners are screws.

8. The fiber optic cable assembly of claim 1, wherein the front surface of the track also defines a longitudinally extending notch located in the center of the front surface of the track for positioning of the fasteners in the center of the track.

9. A fiber optic cable assembly for mounting by adhesive to a perimeter surface of a swimming pool or a spa to provide lighting around the perimeter of the swimming pool or spa, comprising:

a tube having a front surface and a rear surface;

a bundle of fiber optic fibers contained within the tube; and a longitudinal track having a front surface and a rear surface, the front surface including means for receiving the tube to position the rear surface of the tube in opposed alignment with the front surface of the track, the rear surface of the track defining at least one longitudinally extending reservoir sized to retain excess adhesive therein such that the adhesive does not squeeze out from behind the track when the track is mounted on the perimeter surface of the pool.

10. The fiber optic cable assembly of claim 9, wherein the rear surface of the track defines two longitudinally extending reservoirs.

11. The fiber optic cable assembly of claim 10, wherein the rear surface of the track has an upper edge and a lower edge and the two longitudinally extending reservoirs are recesses, one such recess located adjacent to the upper edge of the rear surface of the track and the other located adjacent to the lower edge of the track.

* * * * *